June 16, 1925.
M. L. HEINEKE
1,542,133
TIRE CHANGING DEVICE
Filed July 3, 1924
2 Sheets-Sheet 1
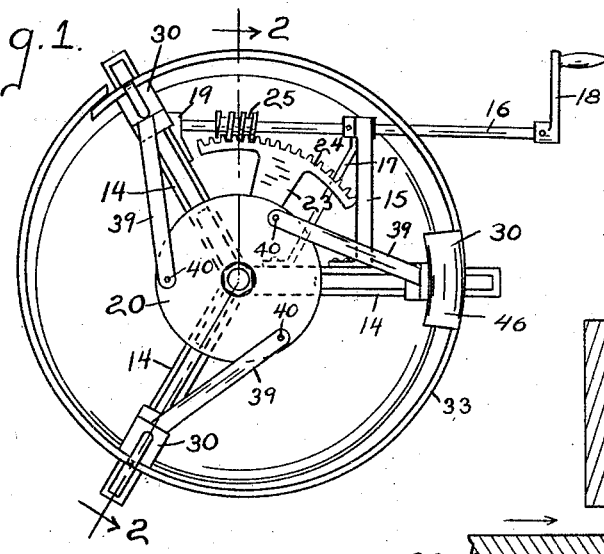
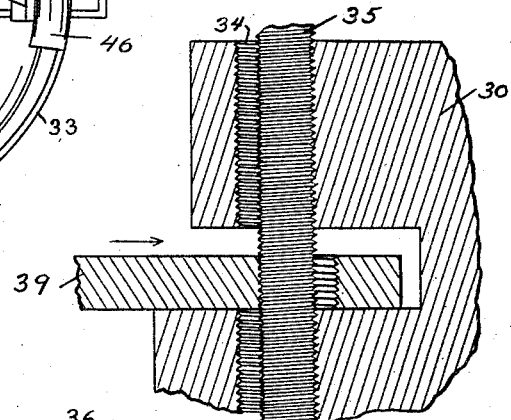
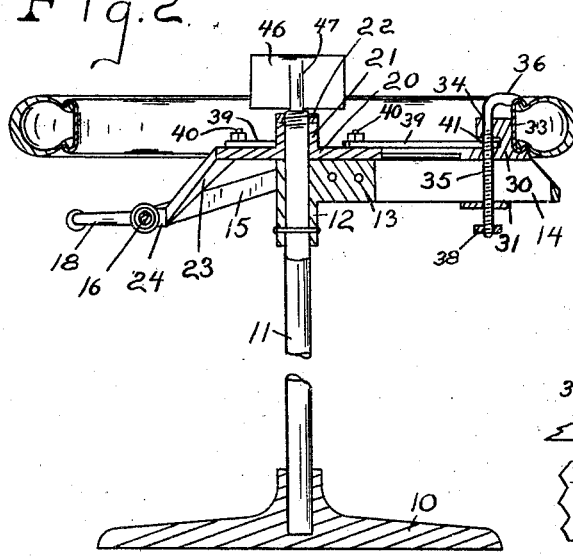
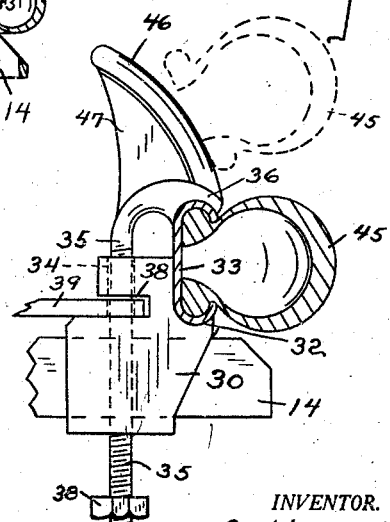
INVENTOR.
Martin L. Heineke
BY
Erwin, Wheeler & Woolard
ATTORNEYS.

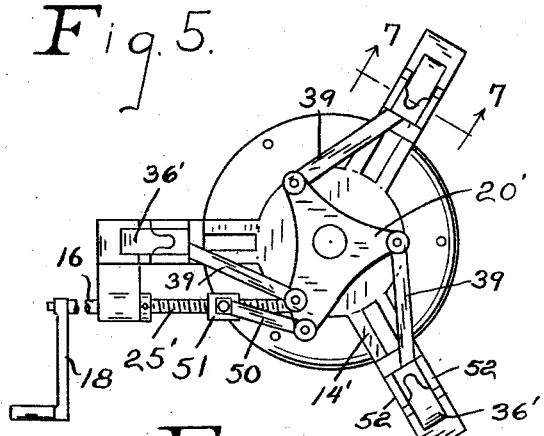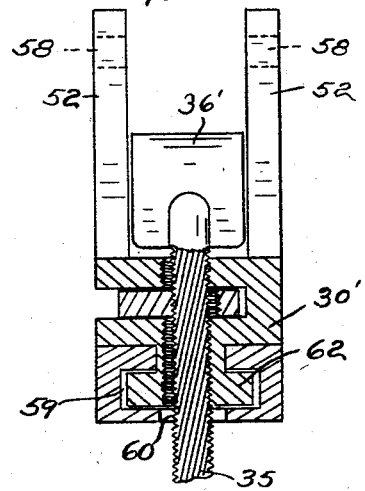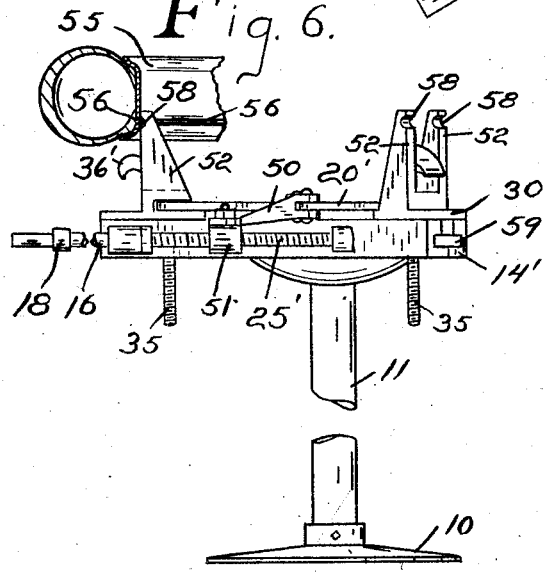

Patented June 16, 1925.

1,542,133

UNITED STATES PATENT OFFICE.

MARTIN L. HEINEKE, OF SPRINGFIELD, ILLINOIS.

TIRE-CHANGING DEVICE.

Application filed July 3, 1924. Serial No. 723,955.

*To all whom it may concern:*

Be it known that I, MARTIN L. HEINEKE, a citizen of the United States, residing at Springfield, county of Sangamon, and State of Illinois, have invented new and useful Improvements in Tire-Changing Devices, of which the following is a specification.

This invention relates to improvements in tire changing devices and, more particularly, to a rim adjusting support upon which a vehicle rim of the demountable type may be carried and adjusted during the tire changing operation.

Devices of this general character in which rim engaging members are moved radially from a central support are well known, but it has hitherto been the practice to provide each of the radially adjustable rim engaging members with an individual screw for controlling its adjustment. Where it was desired to adjust all of the different members simultaneously it has been common to interconnect the several screws adjacent the central axis of the device by means of an axially mounted gear and a pinion upon each screw. The devices above described are unsatisfactory in that they develop excessive friction in the course of their operation, and in that they are expensive to manufacture. It is the primary object of this invention to avoid the above objections and to produce a device which can be easily operated and which may be economically manufactured.

More particularly stated, it is my object to provide means for operating radially movable rim engaging members without employing individual screws for the several members, and without developing excessive friction. Furthermore, it is my object to operate the radially adjustable members with a very considerable degree of mechanical advantage by the use of a single operating screw controlling all of the said members.

Another very important object of this invention relates to an improved means for securely engaging a rim to be manipulated. I provide a pair of relatively adjustable jaws, one of which may be fixed and the other movable, and which are adapted to clampingly engage the rim between them. It is my object to make these jaws instantly adjustable when the device is not subject to load, and to make them engage automatically when load is applied to the device and to retain their engagement at all times when the application of load continues.

In the drawings:

Figure 1 is a plan view of my improved tire changer, showing a split rim contracted thereon.

Figure 2 is a transverse section taken on the line 2—2 in Figure 1, but illustrating a vehicle tire casing upon the rim.

Figure 3 is an enlarged detail view of a special rim engaging jaw provided with means for facilitating the mounting of a tire upon the rim.

Figure 4 is a detail view on a further enlarged scale, showing how the clamp operating links lock the rim engaging jaws against movement when the links are under load.

Figure 5 is a plan view of a slightly differing embodiment of my invention.

Figure 6 is a side elevation of the same.

Figure 7 is a detail view on an enlarged scale of a fragmentary section taken on the line 7—7 of Figure 5.

Like parts are identified by the same reference characters throughout the several views.

A base 10 carries a standard which may comprise a single upright bar 11. A cast metal head 12 upon this standard carries a plurality of radial arms 13 upon which are mounted the longitudinally slotted arm extensions 14. The slots are intended to provide guideways for the movement of the rim engaging clamps but it will be obvious that any other suitable means might be employed to provide such guideways. The provision of arm extensions 14 to be bolted to the stub arms 13 of head 12 is a constructional detail which I have chosen to promote convenience in manufacture and is not broadly material to the principal features herein disclosed.

One of the arms 14 is provided with a bracket 15 for the support of shaft 16. The bracket arm 15 extends laterally and downwardly from the arm 14 by which it is carried and may conveniently be braced from said arm at 17. The shaft 16 is rotatably journaled in the bracket and is provided with a crank 18 for its manual operation. The end of the shaft 16 opposite to that which carries crank 18 may conveniently be journaled in a fitting at 19 attached to another of the arm extensions 14 in the manner clearly indicated in Figure 1. The two axially spaced bearings for shaft 16 insure rigidity and permanence of mounting.

Above the head 12 there is journaled on standard 11 a rotor comprising a disk 20 which may have a bearing sleeve 21. A nut 22 upon the standard may be used to confine the rotor operatively in position. An arm 23 projecting downwardly and laterally from the rotor carries a gear segment 24 with which meshes a worm 25 mounted on shaft 16 intermediate the bearings of said shaft. The arrangement is such that when the crank 18 is manually rotated in either direction a corresponding rotative movement will be transmitted through shaft 16, worm 25, gear segment 24, and arm 23 to the rotor 20.

Upon each of the arms or arm extensions 14 I provide a radially adjustable slide comprising a block 30 formed with an opening 31 to receive the arm extension 14, whereby the block may be guided for reciprocation on the arm extension. The several blocks 30 are preferably identical to permit convenience of manufacture, and each will be provided with a channel at 32 to receive one of the beads or marginal flanges of a vehicle wheel rim such as that shown at 33. The shoulder or portion of the block 30 which provides the channel 32 comprises the fixed jaw of a rim engaging clamp.

The block 30 is provided with a vertically extending aperture 34 affording ample clearance for the threaded post 35 which carries a jaw member 36 provided with a channel adapted for engagement with the opposite flange of rim 33, whereby to cooperate with channel 32 to clampingly engage said rim. For this purpose of jaw portion 36 attached to post 35 is radially offset from said post to overlie the channel 32, as best shown in Figure 3. The post 35 will preferably be of such length that a nut 38 at its lower end will prevent the post from being wholly removed from block 30 and will nevertheless permit of sufficient upward movement of the post to release wholly a rim such as that which is shown in Figure 3 to be engaged in the clamping embrace of jaws or channels 32 and 36. It will be understood that the post 35 is not in threaded engagement with block 30 but is adapted to pass freely through aperture 34 in an axial direction. The aperture 34 may nevertheless be provided with threads complementary to those on post 35 so that in the event that post 35 is forced to one side or the other of aperture 34 the complementary threads will interlock to prevent the post from moving axially.

I provide in each block 30 a recess 38 opening to the rear of the block and adapted to receive a link 39 which is pivoted at 40 to the rotor 20. The link is apertured at 41, which aperture, like aperture 34 in block 30, is preferably sufficiently large to permit the free passage of threaded post 35 but is provided internally with threads complementary to those on the post, whereby the link and the post may interlock when subjected to lateral pressures. It will be obvious that when the link is moved slightly in a lateral direction with reference to post 35, it will be interlocked therewith through the threads above described and will thereby be secured against relative vertical movement.

Since the block 30 is confined against vertical movement with reference either to rim 33 or arm extension 14, it will be obvious that the threads cut in aperture 34 and in post 35 will provide a sufficient interlocking engagement to prevent the said post from being moved vertically. Furthermore, since the link 39 is confined against any material vertical movement while its end is retained in recess 38, it will be clear that the interlocking of the said link with the post 35 will also be adequate to secure the post against vertical movement. Consequently, either of the two interlocking sets of teeth may be used independently to satisfy the purposes of this invention, or both may be used together, as indicated.

I wish to call attention further to the fact that the threads, as used in this invention, perform merely an interlocking function such as might be accomplished by any teeth, serrations, or abrasion. The only advantage in using threads rather than some other type of abrasion or roughness in the surfaces which it is desired to interlock, lies in the fact that where the thread is used it may serve the additional purpose of receiving the retaining nut 35'.

It will be perfectly obvious that the rotor 20 comprises with each of the links 39 a toggle lever which, when the rotor is oscillated in one direction, will radially retract the slides 30 and, when rotated in the opposite direction, will radially project such slides. If the clamping jaws of each such slide are engaged with a wheel rim such as that shown at 33, and if the crank 18 be operated in such a direction as to retract the several slides, it will be obvious that the rim must be contracted, as indicated in Figure 1. Each of the slides will be noted to include a portion which abuts the inside of a rim to transmit rim expanding pressure thereto. Consequently, when the tire casing 45 has been applied over the rim the rim may readily be expanded to its original position by a reverse rotation of crank 18.

In order to facilitate the application of casings to the contracted slit rim, I prefer to provide one or more of the posts 35 and clamping jaws 36 with an upwardly extending guide member 46. The guide member 46 may have any desired arcuate or peripheral extent and is preferably curved in a horizontal plane in substantial conformity with the inner surface of the tire casing bead and is curved in a vertical plane, as best shown in Figure 3, to provide an inclined plane surface for guiding the casing into place and distending it if necessary. It performs a function similar to that of a shoe horn. A web 47 may be used to support the upper part of the operative guiding surface 46 from post 35, if desired.

In the device shown in Figures 5 to 6, inclusive, there are two principal changes. The rotor 20', instead of being actuated by means of a segment meshing with a worm, is connected by a link 50 with a nut 51 threaded upon the worm or screw 25', this worm or screw being carried by shaft 16 having a handle 18 as in the device previously described. The link 50 is, of course, pivoted to the nut and to the rotor as indicated, and the advantages of the mechanism heretofore described are also inherent in the device shown in Figures 5 and 6, since but one worm or screw is necessary to the operation of the device and the operation of this single screw actuated radially each of the slides which engage the rim.

A second feature of difference is found in the slides themselves. In the modified construction each slide or block 30' carries a pair of laterally spaced upwardly extending rim-abutting members 52. The ordinary split rim will rest upon the slide 30' and against the abutments 52. Between these abutments the hook-shaped rim engaging jaw 36' is manually adjustable vertically, this jaw being carried by a threaded or otherwise serrated post 35 corresponding to that previously described. The hooks 36' project radially from between the abutments 52 to a sufficient extent to engage the margin of a split rim somewhat in the manner in which such a rim is engaged by the hook or jaw members 36 previously described.

Certain types of rims, such as that shown at 55, are not split but are provided in their inner periphery with an annular bead 56. In a tire changing apparatus it is frequently more convenient to remove a casing downwardly from such a rim than upwardly, and in order to make this possible I have provided upon the abutments 52 aligned grooves or notches 58 which are disposed above the hook-shaped clamping jaw 36'. By rotating the screw 25' the several slides 30' may be simultaneously advanced along radial lines to a position for interlocking engagement between the bead 56 of a rim 55 and the grooves 58 with which the abutments of each slide are provided. A rim thus engaged will obviously be locked securely in position, and the casing thereon may be removed either upwardly or downwardly from the rim so supported. This makes unnecessary the mounting of screw 25' in the downwardly displaced position in which worm 25 is shown in Figure 2.

It will be noted that the arms 14' differ in their specific construction from arm extensions 14 previously described. The arms 14' are provided with a T-slot 59 which opens upwardly throughout the length of the arm and opens downwardly as at 60. The block or slide member 30' includes a portion 62 operating in the slot 59, and the opening 60 is provided to allow the serrated post 35 to project through the entire arm 14' in any position of adjustment of the slide.

As best shown in Figure 5, the rotor 20' does not necessarily comprise a disk as illustrated in Figure 1 at 20. It may consist of a spider providing the necessary fulcrum points for the links 39, which links, in the modified construction, correspond to those previously described.

From the foregoing it will be seen that the principal changes incorporated in the modified construction shown in Figures 5, 6, and 7, consist in the construction of the individual slides and in the arrangement whereby a nut instead of a gear segment is utilized for the actuation of the slide. The shape of the rotor and the particular construction of the arms which provide guideways for the radially movable slides are, of course, relatively unimportant details.

In the annexed claims I have used the word "screw" in a generic sense to designate the device shown at 25 and also the device shown at 25'.

I claim:

1. The combination of a pair of clamping jaws and means for moving the jaws transversely of the line of their clamping movement, one of said jaws having a portion guided for movement longitudinally with reference to the other and having a slight lateral motion permitting free longitudinal play in the absence of such transverse motion, said means for producing the transverse motion being connected to one of said jaws to move it laterally with reference to the other and thereby bind said portion.

2. The combination of a pair of clamping jaws and means for moving the jaws transversely of the line of their clamping movement, one of said jaws having a portion guided for movement longitudinally with reference to the other and having a slight lateral motion permitting free longitudinal play in the absence of such transverse motion, said means for producing the transverse motion being connected to said jaw to move it laterally with reference to the other and thereby bind said portion.

3. In a device of the character described, the combination with an apertured jaw member, of a second member adjustable through the aperture of the first mentioned member and provided with a second jaw, said members being formed for interlocking engagement in a plurality of positions of relative adjustment, and means for subjecting said members to relative lateral pressure, whereby to effect such interlocking engagement.

4. The combination of a pair of clamping jaws and means for moving the jaws transversely of the line of their clamping movement, one of said jaws having a portion guided for movement longitudinally with reference to the other and having a slight lateral motion permitting free longitudinal play in the absence of such transverse motion, said means for producing the transverse motion being connected to one of said jaws to move it laterally with reference to the other and thereby bind said portion, said jaws having means automatically operative when said jaw is moved laterally to hold the jaws relatively fixed in gripping relation.

5. In a device of the character described, the combination with a rim support, of a connecting rod confined against material vertical movement with reference to said support and provided with a fulcrumed opening, and a member vertically adjustable with reference to said support and provided with rim engaging means, said member being freely movable axially through the aperture of said connecting rod in one position of relative lateral adjustment and said member and said connecting rod being formed for interlocking engagement in another relative position of lateral adjustment, whereby to restrain said member against axial movement in said last mentioned adjustment.

6. In a device of the character described, the combination with a rim support provided with a vertically extending opening having a serrated marginal portion and a laterally opening recess, of a connecting rod extending into said recess and provided with an aperture adapted for registry with the said opening, a member freely adjustable in one lateral position through said opening, an aperture provided with a serrated portion adapted in another relative lateral position to interlock with the serrated portion of the margin of said opening, and rim engaging means carried by said member.

7. The combination of a pair of clamping jaws and means for moving the jaws transversely of the line of their clamping movement, one of said jaws having a portion guided for movement longitudinally with reference to the other and having a slight lateral motion permitting free longitudinal play in the absence of such transverse motion, said means for producing the transverse motion being connected to said jaw to move it laterally with reference to the other and thereby bind said portion, said jaws having means automatically operative when said jaw is moved laterally to hold the jaws relatively fixed in gripping relation.

8. In a device of the class described, a support having substantially radially disposed guideways, a central rotor, a plurality of slides adjustable to and from said rotor along said guideways, means connecting said rotor with the slides whereby to actuate the latter simultaneously, rim clamping jaws on each of said slides, one of said jaws having a portion guided for movement longitudinally with reference to the other and having a slight lateral motion permitting free longitudinal play in the absence of said radial movement along the guideways, said means for connecting the rotor with said slides being connected to one of said jaws to move it laterally with reference to the other and thereby bind said portion.

9. In a device of the character described, the combination with a standard, of a head thereon including a plurality of radially extending arms, slides reciprocable upon said arms and provided with rim receiving portions, a disk mounted centrally on said standard, crank pins mounted on said disk, a gear segment carried by the disk, a worm meshing with said segment, a shaft supporting said worm and carried from a plurality of said arms, links connecting said crank pins with said slides, and pivot pins maintaining said links in operative engagement with their respective slides, each of said pivot pins being provided with a rim engaging member adapted to co-operate with the rim receiving portion of the slide, and each of said pivot pins being formed for interlocking engagement with its respective slide under pressure of the link fulcrumed thereon.

10. In a device of the character described, the combination with a standard, of a head thereon including a plurality of radially extending arms, slides reciprocable upon said arms and provided with rim receiving portions, a disk mounted centrally on said standard, crank pins mounted on said disk, a gear segment carried by the disk, a worm meshing with said segment, a shaft supporting said worm and carried from a plurality of said arms, links connecting said crank pins with said slides and pivot pins maintaining said links in operative engagement with their respective slides, each of said pivot pins being provided with a rim engaging member adapted to co-operate with the rim receiving portion of the slide, each of said pivot pins being vertically adjustable with reference to its respective slide and being formed for interlocking engagement under pressure of its respective link with a part relatively fixed against vertical movement, whereby to maintain said jaw and said slide relatively fixed when said link is exerting pressure through said pivot pin upon said slide.

11. In a device of the class described, a rim support, a plurality of gripping jaws positioned over said support and adapted to co-operate therewith to grip a rim, said jaws having rim gripping surfaces and at least one having associated therewith a laterally and inwardly directed arcuate tire guiding surface extending outwardly therefrom in a smooth unbroken plane a distance at least equal to substantially the width of the rim engaging base of a tire and struck on an arc serving to direct the tire to a rim held by said jaws and support when the tire is swung about a point substantially diametrically opposite said guiding surface.

12. In a device of the class described, a rim support, a plurality of gripping jaws positioned over said support and adapted to co-operate therewith to grip a rim, said jaws having rim gripping surfaces and at least one having associated therewith a laterally and inwardly directed arcuate tire guiding surface extending outwardly therefrom in a smooth unbroken plane a distance at least equal to substantially the width of the rim engaging base of a tire and struck on an arc serving to direct the tire to a rim held by said jaws and support when the tire is swung about a point substantially diametrically opposite said guiding surface, said guiding surface being of substantial width and curved also in the direction of its width to conform to the arc of the tire.

MARTIN L. HEINEKE.